Patented Oct. 8, 1946

2,408,946

UNITED STATES PATENT OFFICE 2,408,946

POLISHING WHEEL AND CEMENT THEREFOR

Harold R. Nelson, Detroit, Mich.

No Drawing. Application July 17, 1944,
Serial No. 545,399

5 Claims. (Cl. 51—308)

The present invention pertains to a novel polishing wheel and cement therefor. Polishing or buffing wheels composed of a body of vegetable or animal fibrous material, such as felt, cotton, leather or sheepskin, are known in the art. It is also customary to secure abrasive grains to the surface of such a wheel by means of an adhesive.

One of the difficulties encountered in the use of such a wheel is softening of the adhesive by the heat developed in use, with the result that the abrasive coating deteriorates. More specifically, the abrasive grains become buried in the adhesive or, in other words, the working surface becomes glazed and hence worthless for its intended purpose.

The principal object of the invention is to overcome this difficulty and thereby prolong the useful life of the wheel. This object is accomplished by the use of an adhesive that is substantially more resistant to heat than adhesives previously used in this art.

Inasmuch as other cements become brittle when their heat resistance is increased by modification of the ingredients, and brittleness is highly undesirable in a polishing wheel, another object of the invention is to provide a cement that has high resistance to heat without sacrificing its pliability. This desirable combination of properties is brought about by a particular selection of ingredients as hereinafter set forth.

The novel adhesive is characterized by the use of a relatively small amount of finely ground asbestos incorporated in a combination of clays and other materials.

A typical and satisfactory adhesive is composed as follows:

| | Parts by weight |
|---|---|
| Silicate of soda | 834 |
| Hanover clay | 26 |
| Brunswick clay | 26 |
| Other clay | 48 |
| Aluminum silicate | 20 |
| Finely ground asbestos | 25 to 60 |

The chemical composition of Hanover clay and Brunswick clay is as follows:

| | Hanover clay | Brunswick clay |
|---|---|---|
| | Per cent | Per cent |
| Silica, $SiO_2$ | 59.0 | 45.60 |
| Alumina, $Al_2O_3$ | 27.1 | 37.09 |
| Lime, CaO | 0.3 | None |
| Magnesia, MgO | 0.5 | 0.18 |
| Titania, $TiO_2$ | 1.0 | 1.10 |
| Iron, $Fe_2O_3$ | 1.5 | 0.71 |
| Soda, $Na_2O$ | 0.9 | 1.10 |
| Potash, $K_2O$ | 0.7 | 0.09 |
| Ignition, loss | 9.1 | 13.75 |

The important characteristics of these clays, insofar as the invention is concerned, is the silica and alumina content.

In relation to the aforementioned ingredients, the asbestos varies from 2.5% to about 6%. Water may be added until the desired consistency for the purpose at hand is obtained. Likewise, the clay or a mixture of different clays may be selected for special requirements, although those mentioned above are generally satisfactory.

In preparing the composition, the ingredients are charged into a vessel and heated, with stirring, until a uniform consistency has been produced.

In coating the wheel, the surface of the body to be employed for polishing or buffing is first coated with the adhesive. The adhesive grains are then applied either by sprinkling, laying the coated surface against a mass of abrasive grains or, if the periphery is to be treated, rolling the wheel over a mass of grains. After the adhesive has dried, the wheel is ready for use.

A wheel made up in this manner has a considerably longer life than prior wheels having abrasive grains cemented to a fibrous body. In fact, such a wheel can be subjected to a pressure enabling it to cut through a thickness of metal, without deterioration of the abrasive coating except by frictional wear. Under normal operating conditions, and even under extreme conditions as described, there is no softening of the adhesive nor glazing of the wheel. The abrasive surface is useful until the abrasive grains are worn down.

The wheel remains pliable and does not become chipped in operation. Thus, the life of a given coating is prolonged and, in addition, the wheel body or head is less rapidly worn away and is available for more re-coatings than if subject to chipping.

The invention is not limited to the foregoing formula which has been given only as an illustration. Various modifications are feasible in the selection of grades of material and the addition of special ingredients with regard to specific requirements. The invention is characterized by the presence of a relatively small quantity of asbestos and in other respects as indicated by the appended claims.

It will also be understood that the invention is not restricted to the precise materials disclosed herein and that the appended claims are intended to embody the legal range of equivalents.

Having thus fully described my invention, what I claim and secure by Letters Patent is:

1. A polishing member comprising a fibrous body, abrasive particles adhered thereto, the adhesive for said particles containing 2½% to 6% of finely ground asbestos and about 10% of clay in relation to the solid content.

2. A polishing member comprising a fibrous body, abrasive particles adhered thereto, the adhesive for said particles containing approximately, by weight, 834 parts of sodium silicate, 100 parts of clay and 25–60 parts of finely ground asbestos fiber.

3. A polishing member comprising a fibrous body, abrasive particles adhered thereto, the adhesive for said particles containing approximately, by weight, 834 parts of sodium silicate, 20 parts of aluminum silicate, 100 parts of clay, and 25 parts to 60 parts of finely ground asbestos fiber.

4. A polishing member comprising a fibrous body, abrasive particles adhered thereto, the adhesive for said particles containing approximately, by weight, 850 parts of silicates, the major portion of which is sodium silicate, 26 parts Hanover clay, 26 parts Brunswick clay, 48 parts of other clay, and 25 to 60 parts of finely ground asbestos fiber.

5. A polishing member comprising a fibrous body, abrasive particles adhered thereto, the adhesive for said particles containing approximately, by weight, 834 parts of sodium silicate, 20 parts of aluminum silicate, 100 parts of clay, and 25 to 60 parts of finely ground asbestos fiber, 26 parts Hanover clay, 26 parts Brunswick clay, 48 parts other clay, and 25 to 60 parts of finely ground asbestos fiber.

HAROLD R. NELSON.